United States Patent
Talmon-Gros et al.

(10) Patent No.: US 10,691,146 B2
(45) Date of Patent: Jun. 23, 2020

(54) CONTROL VALVE FOR ADJUSTING A FLUID FLOW

(71) Applicant: MANN+HUMMEL GmbH, Ludwigsburg (DE)

(72) Inventors: Dietmar Talmon-Gros, Oberstenfeld (DE); Christoph Baumann, Moeglingen (DE); Christopher Mueller, Ludwigsburg (DE); Markus Braeuer, Kornwestheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 87 days.

(21) Appl. No.: 15/987,549

(22) Filed: May 23, 2018

(65) Prior Publication Data

US 2018/0341280 A1 Nov. 29, 2018

(30) Foreign Application Priority Data

May 24, 2017 (DE) .......... 10 2017 004 972

(51) Int. Cl.
*F16K 11/02* (2006.01)
*F01P 7/16* (2006.01)
(Continued)

(52) U.S. Cl.
CPC ............ *G05D 23/1852* (2013.01); *F01P 7/16* (2013.01); *F01P 7/165* (2013.01); *F16K 11/022* (2013.01); *F16K 11/07* (2013.01); *F16K 31/002* (2013.01); *G05D 23/022* (2013.01); *F01P 2060/04* (2013.01)

(58) Field of Classification Search
CPC .............. G05D 23/1852; F01P 7/165; F01P 2003/2292; F16K 31/002
See application file for complete search history.

(56) References Cited

U.S. PATENT DOCUMENTS 3,575,207 A * 4/1971 Denner .................... F16K 3/02
137/556
3,752,222 A * 8/1973 Olbermann, Jr. ...... F01M 5/007
165/280

(Continued)

FOREIGN PATENT DOCUMENTS

| DE | 3428671 A1 | 2/1986 |
| DE | 3714691 A1 | 12/1988 |
| EP | 2275891 A2 | 1/2011 |

*Primary Examiner* — Nelson J Nieves
(74) *Attorney, Agent, or Firm* — James Hasselback

(57) ABSTRACT

A control valve for adjusting fluid flow has a cylindrical housing bushing with a first and a second flow opening. A control bushing is arranged coaxially in the housing bushing and adjustable between control positions opening and/or closing the flow openings. A first spacer disk and a second spacer disk are arranged axially spaced apart at the housing bushing and surround the housing bushing. At least the first spacer disk is arranged eccentrically at the housing bushing by eccentric displacement relative to a longitudinal axis of the control valve. A first side of the housing bushing has a larger radial spacing relative to an outer rim of the first spacer disk than a second side of the housing bushing. At least one of the first and second flow openings is arranged at the first side of the housing bushing. A cooling system is provided with such a control valve.

12 Claims, 3 Drawing Sheets

(51) Int. Cl.
*F16K 31/00* (2006.01)
*G05D 23/185* (2006.01)
*G05D 23/02* (2006.01)
*F16K 11/07* (2006.01)

(56) References Cited

U.S. PATENT DOCUMENTS

| | | | | |
|---|---|---|---|---|
| 4,103,824 | A * | 8/1978 | Seifert | F01P 7/16 236/101 E |
| 4,288,031 | A * | 9/1981 | Hass | F01P 7/16 123/41.1 |
| 4,456,167 | A * | 6/1984 | Buter | G05D 23/022 236/100 |
| 4,679,530 | A * | 7/1987 | Kuze | F01P 7/16 123/41.1 |
| 5,535,943 | A * | 7/1996 | Kahle | F16K 11/044 137/625.4 |
| 5,579,992 | A * | 12/1996 | Masatoshi | F16K 31/002 236/12.21 |
| 6,050,495 | A * | 4/2000 | Suda | F01P 7/16 123/41.09 |
| 6,688,857 | B1 * | 2/2004 | Choroszylow | F01C 11/008 417/313 |
| 6,843,210 | B2 * | 1/2005 | Engelin | F01P 7/16 123/41.1 |
| 7,445,161 | B2 * | 11/2008 | Inoue | F01P 7/16 236/101 C |
| 2002/0157404 | A1 * | 10/2002 | Pauwels | F04B 39/06 62/84 |
| 2003/0234295 | A1 * | 12/2003 | Mace | G05D 23/1353 236/12.2 |
| 2006/0071088 | A1 * | 4/2006 | Adams | G05D 7/012 236/50 |
| 2008/0035744 | A1 * | 2/2008 | Mace | G05D 23/1353 236/12.2 |
| 2009/0256094 | A1 * | 10/2009 | Sasago | F15B 13/0405 251/129.15 |
| 2009/0272441 | A1 * | 11/2009 | Sasaki | F01P 7/16 137/468 |
| 2011/0146812 | A1 * | 6/2011 | Hong | F16K 11/044 137/468 |
| 2012/0103577 | A1 * | 5/2012 | Heldberg | F01P 7/16 165/121 |
| 2013/0263801 | A1 * | 10/2013 | Lee | F01P 7/165 123/41.08 |
| 2014/0069522 | A1 * | 3/2014 | Kuze | F01P 7/14 137/334 |
| 2014/0284183 | A1 * | 9/2014 | Wolters | B65G 23/08 198/788 |
| 2015/0053778 | A1 * | 2/2015 | Uhman | F16K 11/044 236/34.5 |
| 2015/0059873 | A1 * | 3/2015 | Quinty | G05D 23/00 137/468 |
| 2015/0185738 | A1 * | 7/2015 | Qiu | F16K 11/044 236/101 A |
| 2016/0048141 | A1 * | 2/2016 | Xie | F61K 11/0787 236/12.16 |
| 2016/0169082 | A1 * | 6/2016 | Contaldi | F01C 21/0809 123/41.42 |
| 2016/0178079 | A1 * | 6/2016 | Schneider | F16K 27/029 137/798 |
| 2016/0224037 | A1 * | 8/2016 | Qiu | F01M 5/007 |
| 2017/0074155 | A1 * | 3/2017 | Shimomura | F01P 7/16 |

* cited by examiner

CONTROL VALVE FOR ADJUSTING A FLUID FLOW

TECHNICAL FIELD

The invention relates to a control valve for adjusting a fluid flow, in particular a thermostat valve, with a cylindrical housing bushing into which a first and a second flow opening are introduced, with a cylindrical control bushing which is arranged coaxially to the housing bushing and which, relative to the housing bushing, is adjustable between positions opening and closing the first and/or the second flow opening.

BACKGROUND OF THE INVENTION

EP 2 275 891 A2 discloses a thermostat valve for an oil cooler by means of which an oil cooling flow can be guided, temperature-dependent, either for cooling to an oil cooler or, without cooling, through a bypass past the oil cooler. The thermostat valve comprises a cylindrical housing bushing, into which, axially spaced apart, a first and a second flow opening are introduced, as well as a control bushing arranged in the housing bushing that, temperature-dependent, is adjustable axially between positions opening and closing the first and/or the second flow opening. As a function of the temperature, the oil cooling flow is guided either completely via the first flow opening, completely via the second flow opening, or partially via the first and partially via the second flow opening and thus accordingly to the oil cooler or through the bypass or with a partial flow to the oil cooler as well as through the bypass.

The housing bushing is surrounded by a radially projecting separating ring which is located axially between the first and the second flow openings.

DE 10 2013 015 481 A1 discloses a control device for selectively connecting and separating fluid connecting locations by means of a valve device which is actuatable by an electric actuator. The valve device is capable of controlling three fluid connectors: a pressure connector, an operative connector, and a tank connector which are present at a control block. The tank connector is in this context coaxially arranged relative to a longitudinal valve axis while the operative and pressure connectors are radially displaced. In order to enable a flow from the pressure connector to the operative connector, the control valve is held in the control block by means of a receiving plate in which an eccentric receiving bore is present. Due to numerous flow deflections, the control device disclosed therein has a comparatively high pressure loss.

SUMMARY OF THE INVENTION

It is the object of the invention to embody with simple constructive measures a control valve for adjusting a fluid flow in such a way that the flow resistance through the control valve is reduced.

This object is solved according to the invention in that two axially spaced apart spacer disks surrounding the housing bushing are arranged at the housing bushing, wherein at least one of the spacer disks is arranged eccentrically relative to the longitudinal control valve axis at the housing bushing, and wherein at least one flow opening is arranged at the side of the housing bushing provided with a larger spacing relative to the outer rim of the spacer disk.

The dependent claims provide expedient further embodiments.

The control valve according to the invention serves for adjusting a fluid flow through a first and a second flow opening in the control valve. The control valve is in particular a thermostat valve that switches as a function of the temperature of the fluid flow. The control valve is preferably used in a cooling system or lubricating system, in particular in a motor vehicle, for example, in an oil cooler, wherein the control valve in the cooling system, as a function of the temperature, guides the fluid flow either to the liquid cooler or to a bypass that bypasses the liquid cooler.

The control valve comprises a cylindrical housing bushing in which a cylindrical control bushing is installed which is arranged coaxially to the housing bushing and is adjustable relative to the housing bushing. The control bushing is positioned within the housing bushing. In the housing bushing, a first and a second flow opening are provided which, upon the adjusting movement of the control bushing, are opened or closed. It is in particular also possible to open or close each of the flow openings only partially. Advantageously, it is also possible to adjust the control bushing into a position in which both flow openings are at least partially open. In a preferred embodiment, at least one flow opening is at least partially open in each position of the control bushing. Moreover, it is expedient that, in at least one position of the control bushing, at least one flow opening is completely closed.

The adjustment movement of the control bushing is advantageously an axial movement relative to the longitudinal axis of the control valve which coincides with the longitudinal axis of the housing bushing and of the control bushing. In an alternative embodiment, the adjusting movement is a rotary movement of the control bushing about the longitudinal housing axis or a combination of rotary movement and axial movement.

At least one surrounding spacer disk is arranged at the housing bushing and is fixedly connected with the housing bushing. The spacer disk is located at the exterior side of the housing bushing and projects past the wall surface of the housing bushing in radial direction. In the installed state in the cooling system, the spacer disk holds the control valve in a defined radial position relative to the inwardly positioned side walls of a preferably cylindrical receiving space into which the control valve is inserted. The spacer disk advantageously carries a circumferentially extending sealing element that is located in particular at the outer rim of the spacer disk and separates the axial sections above and below the spacer disk in a flow-tight way. The sealing element is in particular designed as a sealing ring which is inserted into a circumferentially extending groove at the outer rim of the spacer disk.

Relative to the longitudinal control valve axis, the spacer disk is eccentrically arranged at the housing bushing. At least one flow opening is arranged at the side of the housing bushing that has a larger spacing to the outer rim of the spacer disk. This embodiment has the advantage that in radial direction, relative to the longitudinal control valve axis, between at least one flow opening, advantageously between the first flow opening and the second flow opening, and the inner wall of the receiving space in which the control valve is inserted, a relatively large flow space is provided in which the fluid can collect. Upon flow through the control valve from the interior to the exterior, the counter pressure in the outwardly positioned flow space at the exterior side of the housing bushing is reduced and the pressure loss between the interior of the housing bushing and the outwardly positioned flow space is reduced. Accordingly, even at lower temperatures and a higher viscosity of the fluid, an improved flow through the control valve can be achieved. The space requirement of the control valve is not increased due to the eccentric positioning between the spacer disk and the bushings so that the control valve can be received in receiving spaces of unchanged dimensions in a housing of the cooling system.

The advantage of the reduced flow resistance and reduced pressure loss relates to at least one flow opening which is arranged at the side of the housing bushing with larger distance to the outer rim of the spacer disk. When the flow openings are positioned axially above each other, in particular on axially opposite sides of the spacer disk, the second flow opening through which the alternative flow path extends exhibits also the advantage of a larger spacing to the outer rim of the spacer disk so that the fluid flow through the second flow opening also has the advantage of a reduced pressure loss.

As needed, it can be expedient to provide, distributed about the circumference at the same axial height of the first and/or the second flow opening, additional openings in the wall of the housing bushing through which a fluid flow is enabled in radial direction from the interior to the exterior.

The eccentric displacement, by which the spacer disk is displaced relative to the longitudinal control valve axis, amounts advantageously to at least 5% of the inner diameter of the housing bushing, where necessary, at least 10% or at least 15% or at least 20% of the inner diameter of the housing bushing. Moreover, it can be expedient that the eccentric displacement does not surpass a maximum spacing which, for example, amounts to 20% or 30% of the inner diameter of the housing bushing. According to a further advantageous embodiment, the spacer disk is eccentrically arranged in such a way that the maximum radial spacing between the outer rim of the spacer disk and the outer wall of the housing bushing is at least twice as large as the minimum radial spacing between the outer rim of the spacer disk and the outer wall of the housing bushing. In this way, a minimum dimension for the eccentric displacement is provided so that also a correspondingly large flow space is provided in front of the at least one flow opening at the radially outwardly positioned side.

According to a further advantageous embodiment, the outer wall of the housing bushing is positioned all around radially at a spacing to the outer rim of the spacer disk. Therefore, a circumferential spacing between the housing bushing and the outer rim of the spacer disk is provided. As necessary, an embodiment is also conceivable in which the outer wall of the housing bushing touches at one location the outer rim of the spacer disk.

According to the invention, at least two axially spaced apart spacer disks are arranged at the housing bushing. They are advantageously of identical configuration and exhibit the same eccentric positioning in radial direction and the same eccentric displacement. Providing two spacer disks has the advantage that the fluid flows that are guided in radial direction from the interior to the exterior can be separated from each other and also are separated relative to the fluid flow axially flowing into the control valve. In this context, one of the flow openings is arranged axially between the two spacer disks.

According to a further expedient embodiment, the control valve is provided with a control element for adjusting the control bushing wherein the control element is embodied as a thermocouple element that adjusts the position of the control bushing as a function of temperature. As an alternative to a thermocouple element, other actuators are also conceivable, for example, electromagnetic control elements that are switched as a function of the temperature of the fluid flow.

The invention concerns also a cooling system with a liquid cooler, in particular an oil cooler or a fuel cooler, wherein the cooling system is provided with an afore described control valve. The control valve enables guiding the fluid flow in the cooling system as a function of the temperature either to the liquid cooler or to a bypass by which the liquid cooler is bypassed. As necessary, partial flows are guided through the liquid cooler as well as through the bypass.

The housing bushing and the control bushing are advantageously cylindrically embodied. However, an embodiment with a non-cylindrical cross section, for example, an oval cross section, is also conceivable. Moreover, it is also advantageous that the spacer disk has a round cross section shape even though in this case non-round cross section shapes, in particular oval cross section shapes, are possible.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 2:
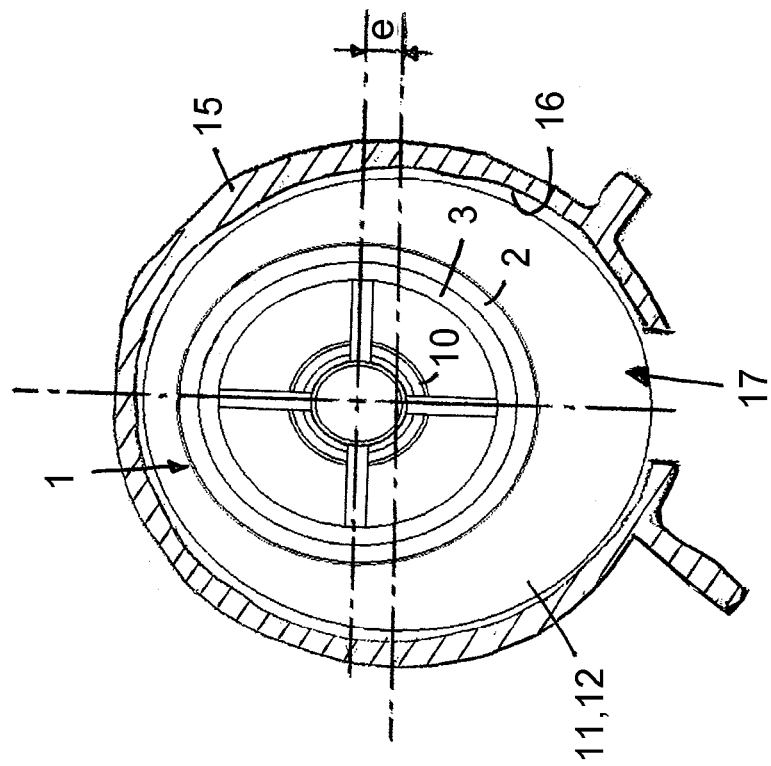
FIG. 2 is a section transverse to the longitudinal axis through a thermostat valve that is integrated into a housing of the cooling system.

In the Figures, a control valve 1 embodied as a thermostat valve for controlling a fluid flow, for example, an oil flow to an oil cooler, is illustrated. The thermostat valve 1 comprises a hollow cylindrical housing bushing 2 and a coaxially arranged, hollow cylindrical control bushing 3 inserted into the housing bushing 2. The longitudinal control valve axis, which is forming at the same time the longitudinal axis of the bushings 2 and 3, is referenced by reference character 4. Distributed about the circumference at axially identical height, a plurality of first flow openings 5 are provided in the housing bushing 2 as well as, axially spaced therefrom, also a plurality of second flow openings 6 distributed about the circumference and positioned axially at the same height. The first flow openings 5 and the second flow openings 6 serve for controlling, as a function of the fluid temperature, the fluid flow either to a cooler bypass (flow openings 5) or, at higher temperatures, to a liquid cooler (flow openings 6).

Figure 1:
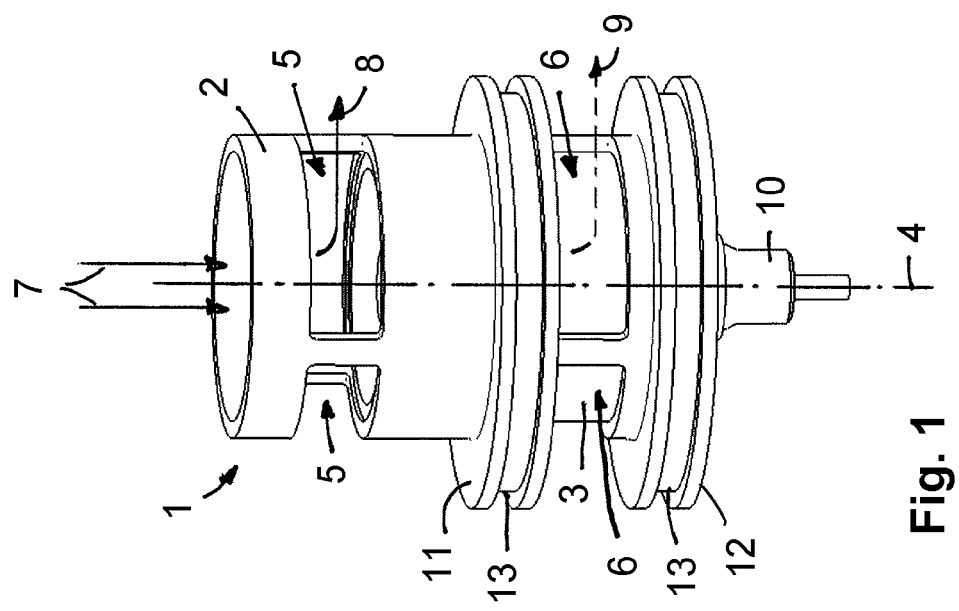
FIG. 1 is a perspective view of a control valve that is embodied as a thermostat valve.

As can be seen in FIG. 1, the fluid according to flow arrows 7 is guided through the upper end face of the housing bushing 2 axially into the interior of the housing bushing 2 and, in the position illustrated in FIG. 1 of the control bushing 3, discharged in radial direction through the first flow openings 5 according to arrow 8. The position illustrated in FIG. 1 of the control bushing 3, which is axially slidably arranged within the receiving housing bushing 2, corresponds to a fluid flow temperature below a temperature limit value at which the fluid flow is guided through the first flow openings 5 to the cooler bypass. The second flow openings 6 are closed off by the control bushing 3.

The control bushing 3 is axially adjusted by a control element 10 as a function of temperature. The control element 10 is preferably configured as a passive control element that, without active elements, solely based on a temperature change, changes its control position and correspondingly axially adjusts the control bushing 3 which is connected to the control element 10. Alternatively, an embodiment as an active control element is also conceivable, for example, as an electromagnetic control element that is adjusted by control signals which are generated as a function of sensor-determined temperature signals.

The housing bushing 2 is surrounded at its outer circumference by two spacer disks 11 and 12 which are axially spaced apart relative to each other. The first spacer disk 11 is positioned axially between the first flow openings 5 and the second flow openings 6, the second spacer disk 12 is positioned at the oppositely positioned axial side of the second flow openings 6. Both spacer disks 11 and 12 comprise at their outer circumference a circumferentially extending groove 13 for receiving an annular sealing element.

Figure 4:
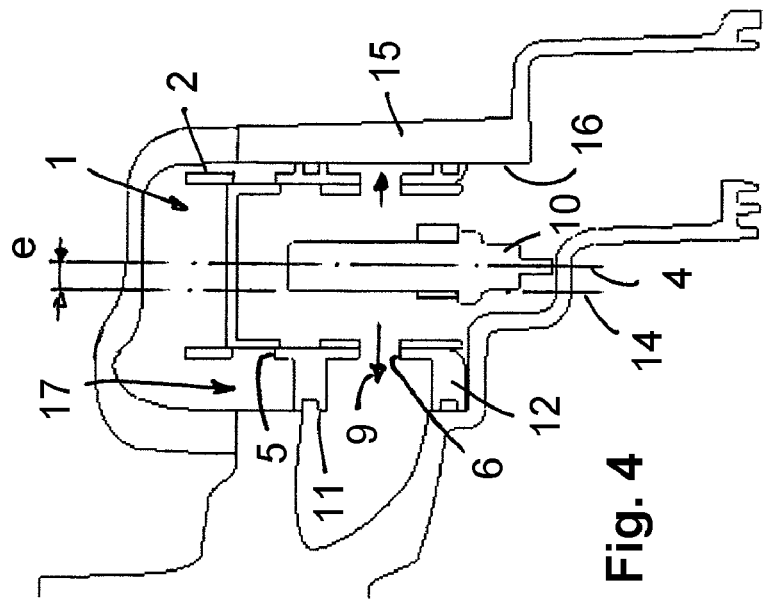
FIG. 4 is an illustration corresponding to FIG. 3 but with the thermostat valve in a second control position.
Figure 3:
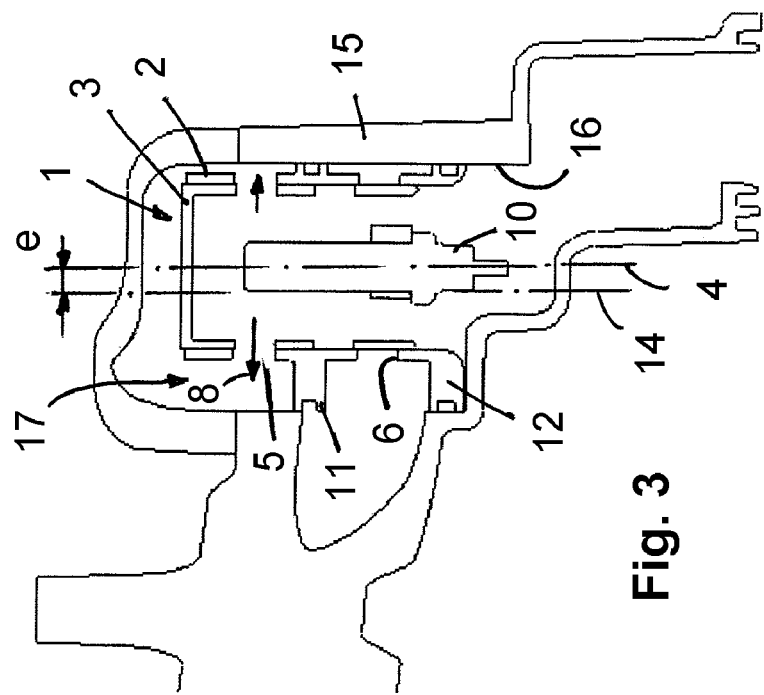
FIG. 3 is a section in longitudinal direction through a housing of a cooling system with thermostat valve that is positioned in a first control position.

As can be seen in FIG. 2 in combination with FIGS. 3 and 4, the two spacer disks 11 and 12 are eccentric relative to the longitudinal control valve axis 4 which represents at the same time the longitudinal axis of the housing bushing 2 and of the control bushing 3. The eccentric displacement e represents the spacing between the longitudinal control valve axis 4 and the longitudinal spacer disk axis 14 (FIG. 3). Accordingly, when the control valve 1 is received in a hollow cylindrical receiving space 16 in a housing 15 of a cooling system, the housing bushing 2 and the control bushing 3 are displaced by the eccentric displacement e in the radial direction relative to the longitudinal axis of the receiving space 16 while the spacer disks 11 and 12, whose outer diameter at least approximately corresponds to the inner diameter of the receiving space 16, are arranged coaxially to the longitudinal axis of the receiving space 16. As can be seen in FIGS. 2, 3, and 4, this results in a flow space 17 which is radially in front of the flow openings 5 and 6 between the outer wall of the housing bushing 2 and the inner wall of the receiving space 16 and which is enlarged at one side by the eccentric displacement e and correspondingly, at the diametrically opposite side, is reduced by the eccentric displacement e. At the radially enlarged side, a flow opening 5 and a flow opening 6 are provided so that the fluid flow, which radially flows outward at this side through the corresponding flow openings 5 or 6 according to arrow 8 (FIG. 3) or arrow 9 (FIG. 4), experiences a reduced flow resistance. In addition, the radial outflow is enabled through the further flow openings 5 or 6 that have a reduced radial spacing relative to the surrounding inner walls of the receiving space 16.

In FIGS. 1 and 3, the control bushing 3 is illustrated in the same control position in which the flow path through the first flow openings 5 according to arrow 8 is open while the second flow openings 6 are closed off by the control bushing 3. In FIG. 4, on the other hand, the control bushing 3 is adjusted by the control element 10 so that the first flow openings 5 at the top are closed off and the second flow openings 6 positioned below are open so that the fluid flow according to arrow 9 through the flow openings 6 is enabled.

Figure 5:
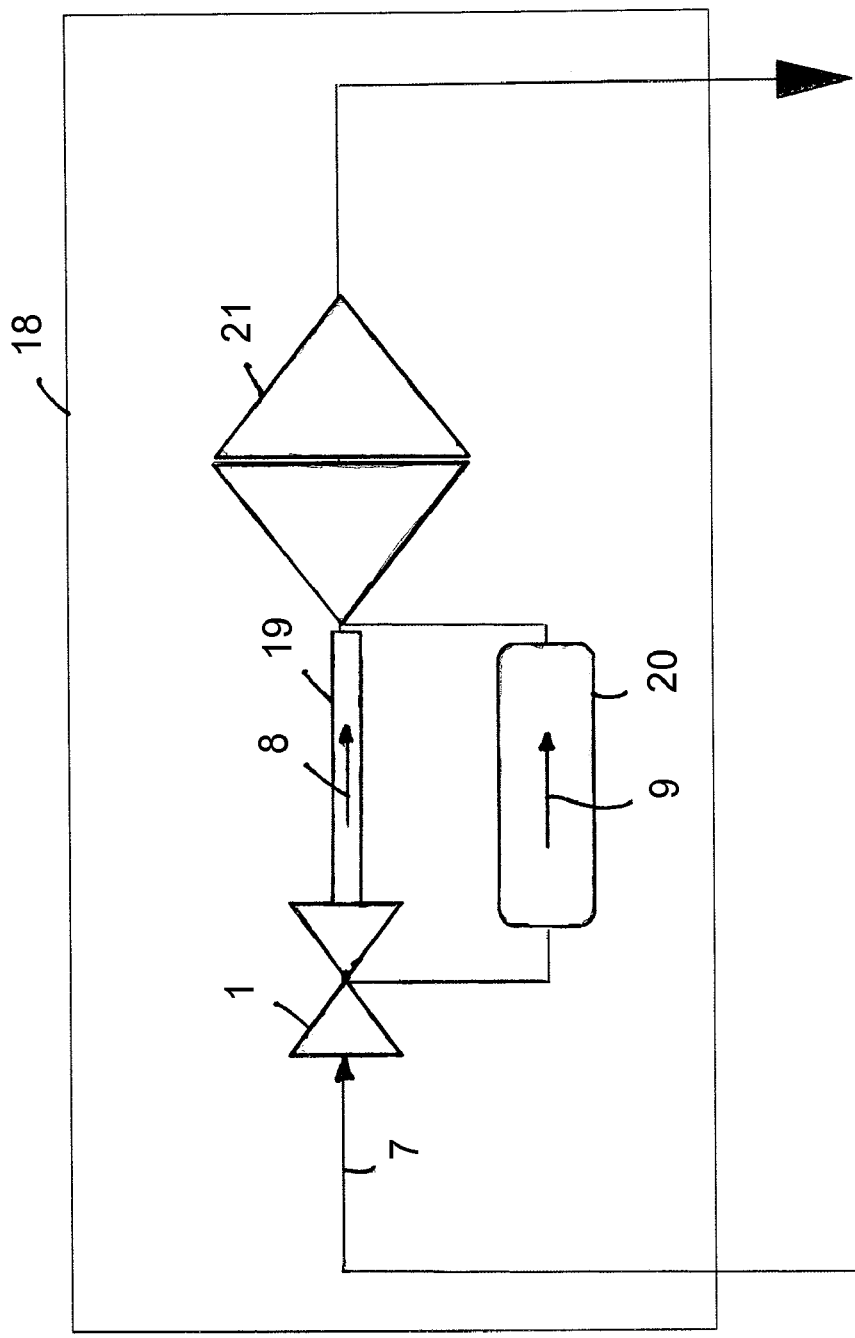
FIG. 5 is a block diagram of an oil module with a thermostat valve for control of an oil flow through an oil cooler or, alternatively, through a bypass.

FIG. 5 shows a block diagram of an oil module 18 for a motor vehicle for cooling and cleaning a cooling oil flow. The oil module 18 comprises a switchable thermostat valve 1 which is embodied in the afore described way. The cooling oil flow is guided according to flow arrow 7 through the thermostat valve 1 and, as a function of its temperature, guided either according to flow arrow 8 through the cooler bypass 19 or, upon surpassing the limit temperature, according to flow arrow 9 through the oil cooler 20. Downstream of bypass 19 and oil cooler 20, a filter element 21 is provided through which the cooling oil flow, passing through the bypass 19 as well as the oil cooler 20, is conducted. During the further course, the temperature-adjusted and purified cooling oil flow is discharged again from the oil module 18 downstream of the filter element 21.

While specific embodiments of the invention have been shown and described in detail to illustrate the inventive principles, it will be understood that the invention may be embodied otherwise without departing from such principles.

What is claimed is:

1. A control valve for adjusting a fluid flow, the control valve comprising:
a hollow cylindrical housing bushing comprising a first flow opening and a second flow opening,
wherein the hollow cylindrical housing bushing surrounds a longitudinal control valve axis;
a cylindrical control bushing arranged coaxially in an interior of the hollow cylindrical housing bushing and slidable along the longitudinal control valve axis, relative to the hollow cylindrical housing bushing, adjust between control positions opening and closing the first flow opening and/or the second flow opening;
a first spacer disk and a second spacer disk arranged axially spaced apart from each other at the hollow cylindrical housing bushing and surrounding the hollow cylindrical housing bushing;
wherein at least the first spacer disk is arranged eccentrically at the hollow cylindrical housing bushing by an eccentric displacement relative to the longitudinal control valve axis of the control valve so that a first side of the hollow cylindrical housing bushing has a larger radial spacing relative to an outer rim of the first spacer disk than a second side of the hollow cylindrical housing bushing;
wherein at least one of the first flow opening and the second flow opening is arranged at the first side of the hollow cylindrical housing bushing;
wherein the eccentric displacement relative to the longitudinal control valve axis amounts to at least 5% of an inner diameter of the hollow cylindrical housing bushing.

2. The control valve according to claim 1, wherein the control valve is a thermostat valve.

3. The control valve according to claim 1, wherein at least the first spacer disk is arranged eccentrically such that a maximum radial spacing between the outer rim and an outer wall of the hollow cylindrical housing bushing is at least twice as large as a minimum radial spacing between the outer rim and the outer wall of the hollow cylindrical housing bushing.

4. The control valve according to claim 1, further comprising
an actuator that slidably adjusts a position of the cylindrical control bushing in the interior of the hollow cylindrical housing bushing between control positions opening and closing the first flow opening and/or the second flow opening as function of temperature of the fluid flow.

5. The control valve according to claim 1, wherein the first flow opening or the second flow opening is arranged between the first spacer disk and the second spacer disk.

6. The control valve according to claim 1, wherein the first flow opening is arranged axially spaced apart from the second flow opening and wherein an axial adjustment of the cylindrical control bushing along the longitudinal control valve axis alternatingly opens and closes the first flow opening and the second flow opening.

7. The control valve according to claim 6, wherein a plurality of the first flow opening are provided and distributed about a circumference of the housing bushing at a same axial height of the housing bushing.

8. The control valve according to claim 6, wherein a plurality of the second flow opening are provided and distributed about a circumference of the housing bushing at a same axial height of the housing bushing.

9. The control valve according to claim 1, wherein the first spacer disk and the second spacer disk each carry a circumferentially extending sealing element.

10. A control valve for adjusting a fluid flow, the control valve comprising:
a hollow cylindrical housing bushing comprising a first flow opening and a second flow opening,
wherein the hollow cylindrical housing bushing surrounds a longitudinal control valve axis;
a cylindrical control bushing arranged coaxially in an interior of the hollow cylindrical housing bushing and slidable along the longitudinal control valve axis, relative to the hollow cylindrical housing bushing, to adjust between control positions opening and closing the first flow opening and/or the second flow opening;
a first spacer disk and a second spacer disk arranged axially spaced apart from each other at the hollow cylindrical housing bushing and surrounding the hollow cylindrical housing bushing;
wherein at least the first spacer disk is arranged eccentrically at the hollow cylindrical housing bushing by an eccentric displacement relative to the longitudinal control valve axis of the control valve so that a first side of the hollow cylindrical housing bushing has a larger radial spacing relative to an outer rim of the first spacer disk than a second side of the hollow cylindrical housing bushing;
wherein at least one of the first flow opening and the second flow opening is arranged at the first side of the hollow cylindrical housing bushing;
wherein the first spacer disk and the second spacer disk are identically embodied and identically eccentrically arranged.

11. A cooling system comprising:
a liquid cooler and a bypass bypassing the liquid cooler;
a control valve arranged upstream of the liquid cooler and upstream of the bypass, wherein the control valve comprises:
a hollow cylindrical housing bushing comprising a first flow opening and a second flow opening,
wherein the hollow cylindrical housing bushing surrounds a longitudinal control valve axis;
a cylindrical control bushing arranged coaxially in an interior of the hollow cylindrical housing bushing and slidable along the longitudinal control valve axis, relative to the hollow cylindrical housing bushing, adjust between control positions opening and closing the first flow opening and/or the second flow opening;
a first spacer disk and a second spacer disk arranged axially spaced apart from each other at the hollow cylindrical housing bushing and surrounding the hollow cylindrical housing bushing;
wherein at least the first spacer disk is arranged eccentrically at the hollow cylindrical housing bushing by an eccentric displacement relative to the longitudinal control valve axis of the control valve so that a first side of the hollow cylindrical housing bushing has a larger radial spacing relative to an outer rim of the first spacer disk than a second side of the hollow cylindrical housing bushing;
wherein at least one of the first flow opening and the second flow opening is arranged at the first side of the hollow cylindrical housing bushing;
wherein the eccentric displacement relative to the longitudinal control valve axis amounts to at least 5% of an inner diameter of the hollow cylindrical housing bushing;
wherein the control valve guides a fluid flow as a function of temperature to the liquid cooler or to a bypass bypassing the liquid cooler.

12. The cooling system according to claim 11, wherein the liquid cooler is an oil cooler.

* * * * *